Oct. 11, 1927.  
I. STERN ET AL  
1,645,308  
SANITARY MILK URN

Filed March 4, 1927

Inventors
Ignacz Stern
Irving Roth
Joseph Markowitz
BY
ATTORNEY

Patented Oct. 11, 1927.

1,645,308

UNITED STATES PATENT OFFICE.

IGNACZ STERN, IRVING ROTH, AND JOSEPH MARKOWITZ, OF NEW YORK, N. Y.

SANITARY MILK URN.

Application filed March 4, 1927. Serial No. 172,742.

This invention relates to a new and useful device in the nature of a sanitary milk urn particularly adapted to prevent sediment and the like from collecting in the bottom of the urn.

The object of the invention is to provide a sanitary milk urn of novel construction and arrangement of parts, hereinafter more fully described, claimed and illustrated in the accompanying drawing.

Figure 1:
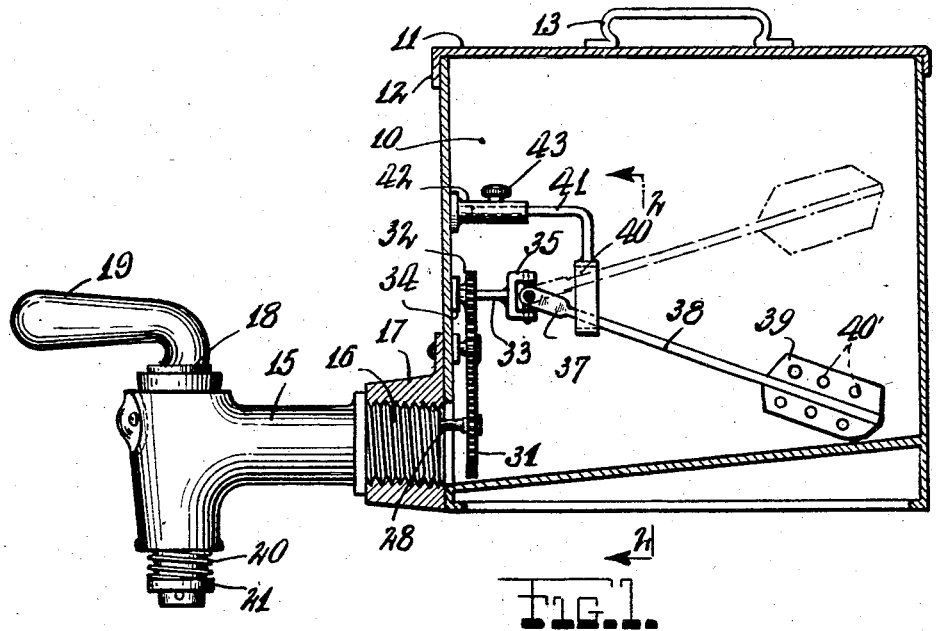
Fig. 1 is a side elevational view of our improved sanitary milk urn, partly in section so as to more clearly show the interior construction thereof.
Figures 2, 3:
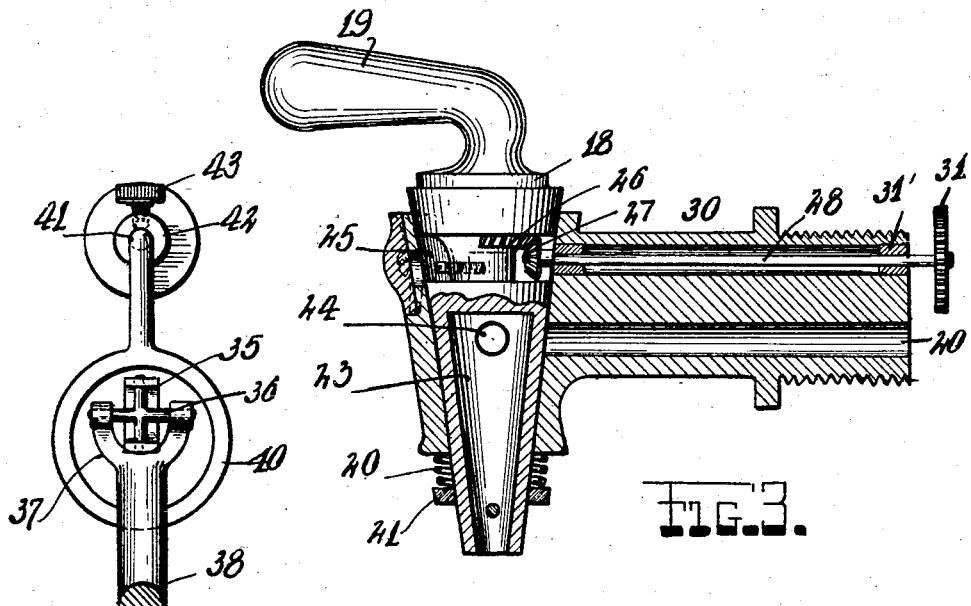
Fig. 2 is an enlarged sectional view taken on the line 2—2 of Figure 1.
Fig. 3 is an enlarged central longitudinal sectional view of the faucet as embodied in our improved device.

As here embodied our improved sanitary milk urn comprises a receptacle 10, or container, of any suitable convenient shape and size. The container 10, is adapted to hold liquids, such as milk, and is provided with an open upper end. The cover 11, is provided with extended sides 12 adapted to slidably engage over the upper portion of the container 10 and has attached thereto a handle 13. The faucet 15 is provided with a threaded shank 16, as a means of attaching same to the extended member 17, soldered, welded, or otherwise attached to the container 10. The faucet 15 is provided with the tapered member 18, rotatively mounted in a similar shaped aperture formed in the faucet 15. The tapered member 18 is provided with a handle element 19. The tapered member 18 is positioned in the above mentioned aperture formed in the faucet 15 by means of an expansion spring 20 wound on the lower portion of the tapered member 18, and positioned intermediate the lower extremity of the faucet 15 and the washer 21, attached to the tapered member 18. The faucet 15 has formed therein an aperture 22, intercommunicative with the container 10, and the above mentioned aperture adapted to receive the tapered member 18. The tapered member 18 has formed therein, at its lower portion, a recess 23 or cavity. The aperture 24 is formed in the tapered portion 18 and is intercommunicative with the recess 23, and with the aperture 22 when the tapered member 18 is turned or rotated by means of the handle element 19. The above described construction is such as will permit the milk in the container 10 to be drawn therefrom, through the faucet 15 when the handle element 19 of the tapered member 18 is turned or rotated, or manipulated as above described and set forth.

The tapered member 18 is provided with an annular groove 25, having cut or otherwise formed therein segment gear teeth 26, adapted to engage with the bevel pinion 27, attached to the shaft 28, rotatively mounted on the bushings 29 and 30, carried in an aperture formed in the faucet 15. The shaft 28 is extended somewhat, into the container 10, and has attached at its extended extremity a gear 31, adapted to mesh with the pinion 32. The pinion 32 is attached to the shaft 33, rotatively mounted in the bearing 34, secured to the side of the container 10, and secured therein. The shaft 34 has attached at its extended extremity, a yoke member 35, to which is pivotally secured the yoke pin 36, similarly secured to the yoke member 37 attached to the extremity of the shaft 38 so as to provide an ordinary universal joint. The beater 39, preferably perforated as at 40', is attached to the free extremity of the shaft 38.

The ring member 40 is positioned over the shaft 38, the said shaft 38 being extended through the ring member 40. The ring member 40 is provided with an extended element 41, formed or bent at right angles thereto. The extended element 41 of the ring member 40 is adapted to slidably engage in an aperture formed in the bracket 42, secured to the side of the container 10. The threaded member 43, a set screw, or the like, is threadedly attached to the bracket 42, as a means of securing the ring member 40 in any desired extended position.

The above described construction being such as to permit the beater 39 to be oscillated, or swung any desired radius, depending upon the positioning of the ring member 40 when the tapered member 18 is turned or rotated, as it is necessary to draw milk from the container 10. It is obvious that the beater 39 will agitate the milk, so as to prevent sediment from collecting in the bottom, and that the beater 39 will agitate the milk, and the cream which will form or collect on the top of the milk, so as to mix the milk and cream, causing a consistent proportion of milk and cream to be drawn through the faucet 15.

Having thus described our invention what we claim as new and desire to protect by Letters Patent of the United States is as follows:

1. In a milk urn of the class described, a receptacle for milk, a faucet attached to said receptacle comprising a stationary member having an auxiliary passage therein, a shaft rotatively journaled in bearings in said passage, and extending into said receptacle, a bevel gear on the outer end of said shaft, a pinion on the inner end of said shaft, a tapered rotatively mounted faucet element journaled in the stationary element of said faucet provided with a peripheral groove adapted to accommodate said bevel gear, teeth on said rotatively mounted faucet element meshed with the teeth of said bevel gear, a stud shaft rotatively mounted on the wall of said receptacle above said faucet, a universal joint on the free end of said stud shaft, an agitator pivotally attached to said universal joint, and driving mechanism comprising a train of gears rotatively mounted on said receptacle wall and operatively connected with said stud shaft and said pinion adapted to rotate said agitator when the rotatively mounted element of said faucet is rotated to open and close said faucet.

2. In a milk urn of the class described, a receptacle for milk, a faucet attached to said receptacle comprising a stationary member having an auxiliary passage therein, a shaft rotatively journaled in bearings in said passage, and extending into said receptacle, a bevel gear on the outer end of said shaft, a pinion on the inner end of said shaft, a tapered rotatively mounted faucet element journaled in the stationary element of said faucet provided with a peripheral groove adapted to accommodate said bevel gear, teeth on said rotatively mounted faucet element meshed with the teeth of said bevel gear, a stud shaft rotatively mounted on the wall of said receptacle above said faucet, a universal joint on the free end of said stud shaft, an agitator pivotally attached to said universal joint, driving mechanism comprising a train of gears rotatively mounted on said receptacle wall and operatively connected with said stud shaft and said pinion adapted to rotate said agitator when the rotatively mounted element of said faucet is rotated to open and close said faucet, a socket member mounted on the wall of said receptacle, and an adjustable guide member slidably mounted in said socket comprising a ring disposed around the shank of said agitator adapted to be adjustably positioned for varying the radius of the circle described by the end of said agitator.

3. In a milk urn of the class described, a receptacle for milk, a socket member rigidly mounted on the inner surface of a wall of said receptacle, a guide member comprising a shank portion adjustably mounted in said socket and a ring on the end of said shank member disposed substantially in the plane of said wall, a stud shaft rotatively mounted on said wall below said socket, a universal joint of said stud shaft, an agitator comprising a shank pivotally attached to said universal joint, and disposed through said guide ring and a paddle member on the free end of said shank, said guide ring being adapted to be extended relative to said socket for varying the radius of the path of said paddle, a faucet attached to said receptacle comprising a rotatively mounted element, and driving mechanism operatively connected with the rotatively mounted element of said faucet adapted to actuate said agitator.

4. In a milk urn of the class described, a receptacle for milk, a faucet having a tapered member rotatively mounted therein attached to said receptacle, a beater rotatively mounted on a wall of said receptacle and operatively connected with said tapered member, and an adjustable guide member mounted on the wall of said receptacle adapted to be suitably positioned for varying the path of movement of said beater, said beater being adapted to be actuated when said tapered member is turned to effect withdrawal of milk from the receptacle.

In testimony whereof we have affixed our signatures.

IGNACZ STERN.
IRVING ROTH.
JOSEPH MARKOWITZ.